United States Patent
Hattori

(10) Patent No.: US 7,289,283 B2
(45) Date of Patent: Oct. 30, 2007

(54) LENS BARREL AND IMAGE PICKUP APPARATUS

(75) Inventor: Kazuhiro Hattori, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/526,823

(22) Filed: Sep. 26, 2006

(65) Prior Publication Data
US 2007/0146909 A1    Jun. 28, 2007

(30) Foreign Application Priority Data
Oct. 28, 2005    (JP)    ............................. 2005-314555

(51) Int. Cl.
*G02B 7/02*    (2006.01)
(52) U.S. Cl. ...................... 359/819; 359/822
(58) Field of Classification Search ................ 359/819, 359/694, 820, 822–830, 811–813
See application file for complete search history.

(56) References Cited
FOREIGN PATENT DOCUMENTS
JP    2000-002559    1/2000

*Primary Examiner*—Tim Thompson
(74) *Attorney, Agent, or Firm*—Rader Fishman & Grauer PLLC; Ronald P. Kananen

(57) ABSTRACT

A lens barrel includes a lens moving frame configured to hold an image pickup lens; a barrel member configured to support the lens moving frame for back and forth linear movement along the direction of an optical axis of the image pickup lens; the lens moving frame having a magnetized face magnetized alternately with N poles and S poles along the direction of the back and forth linear movement; and, a magnetic resistance sensor apparatus. The magnetic resistance sensor apparatus has a magnetic resistance sensor, a body, a single screw, and a plurality of resilient pieces. The resilient pieces are formed such that, in a state wherein the resilient pieces are resiliently deformed all by the same amount, the sum of moments by the resilient pieces which act upon the location of the body at which the screw is fitted is zero.

12 Claims, 8 Drawing Sheets

LENS BARREL AND IMAGE PICKUP APPARATUS

CROSS REFERENCES TO RELATED APPLICATIONS

The present invention contains subject matter related to Japanese Patent Application JP 2005-314555 filed with the Japanese Patent Office on Oct. 28, 2005, the entire contents of which being incorporated herein by reference.

BACKGROUND OF THE INVENTION

1. Field of the Invention

This invention relates to a lens barrel and an image pickup apparatus.

2. Description of the Related Art

An image pickup apparatus such as a digital still camera or a digital video camera has a lens barrel provided therein. A lens barrel of the type is known which includes a lens moving frame for holding an image pickup lens thereon and a barrel member for supporting the lens moving frame for back and forth linear movement along the direction of an optical axis of the image pickup lens. The lens moving frame is moved by a zooming action or a focusing action.

In order to control the movement of the lens moving frame, it is necessary to detect the amount of movement of the lens moving frame. To this end, a magnetized face is formed on the lens moving frame such that N poles and S poles are magnetized alternately along the direction along which the lens moving frame is moved back and forth linearly. A magnetic resistance sensor device is provided on the barrel member and detects the magnetized face to generate a detection signal corresponding to the amount of movement of the lens moving frame. A lens barrel of the type just described is disclosed, for example, in Japanese Patent Laid-open No. 2000-2559.

Incidentally, in order to obtain a detection signal of high quality from the magnetic resistance sensor device, it is necessary to precisely adjust the gap between a sensing face of the magnetic resistance sensor device and the magnetized face. In the lens barrel described, the magnetic resistance sensor device is rocked to move the sensing face toward or away from the magnetized face to perform the adjustment of the gap.

SUMMARY OF THE INVENTION

However, in the lens barrel described above, since the magnetic resistance sensor device is rocked for adjustment of the gap as described above, the sensing face is liable to be inclined with respect to the magnetized face. Therefore, it is difficult to keep the state wherein the sensing face extends in parallel to the magnetized face, and consequently, it is difficult to assure the quality of the detection signal described above. Accordingly, the lens barrel described above is disadvantageous where it is used to enhance the detection accuracy of the amount of movement of the moving lens film.

Further, since the magnetic resistance sensor device is rocked, the lens barrel is complicated in structure and uses an increased number of parts. Therefore, the lens barrel is disadvantageous where it is used to reduce the cost.

Accordingly, it is demanded to provide a lens barrel and an image pickup apparatus wherein the gap between a sensing face and a magnetized face can be adjusted in a simple structure and the accuracy in detection of the amount of movement of a moving lens frame can be enhanced advantageously with a reduced cost.

According to an embodiment of the present invention, there is provided a lens barrel including a lens moving frame, a barrel member, the lens moving frame, and a magnetic resistance sensor apparatus. The lens moving frame is configured to hold an image pickup lens thereon. The barrel member is configured to support the lens moving frame for back and forth linear movement along the direction of an optical axis of the image pickup lens. The lens moving frame has a magnetized face, magnetized alternately with N poles and S poles along the direction of the back and forth linear movement. The magnetic resistance sensor apparatus is provided at an attaching portion of the barrel member and configured to detect the magnetized face to produce a detection signal corresponding to an amount of movement of the lens moving frame. The magnetic resistance sensor apparatus has a magnetic resistance sensor, a body, a single screw, and a plurality of resilient pieces. The magnetic resistance sensor has a sensing face. The body has the magnetic resistance sensor attached thereto with the sensing face exposed. The single screw is fitted in the body in a direction perpendicular to the sensing face and configured to attach the body to the attaching portion with the sensing face opposed to the magnetized face. The plurality of resilient pieces are provided on the body for resilient deformation in a direction perpendicular to the sensing face and configured to contact, in a state wherein the body is attached to the attaching portion by the single screen, with the attaching portion so as to be resiliently deformed all by the same amount by the attaching portion thereby to keep the sensing face in parallel to the magnetized face. The resilient pieces are formed such that, in a state wherein the resilient pieces are resiliently deformed all by the same amount, the sum of moments by the resilient pieces which act upon the location of the body at which the screw is fitted is zero.

According to another embodiment of the present invention, there is provided an image pickup apparatus including a lens barrel, the lens moving frame, and a magnetic resistance sensor apparatus. The lens barrel has an image pickup lens configured to introduce an image pickup subject image to an image pickup device, a lens moving frame configured to hold the image pickup lens thereon, and a barrel member configured to support the lens moving frame for back and forth linear movement in the direction of an optical axis of the image pickup lens. The lens moving frame has a magnetized face, magnetized alternately with N poles and S poles along the direction of the back and forth linear movement. The magnetic resistance sensor apparatus is provided at an attaching portion of the barrel member and configured to detect the magnetized face to produce a detection signal corresponding to an amount of movement of the lens moving frame. The magnetic resistance sensor apparatus has a magnetic resistance sensor, a body, a single screw, and a plurality of resilient pieces. The magnetic resistance sensor has a sensing face. The body has the magnetic resistance sensor attached thereto with the sensing face exposed. The single screw is fitted in the body in a direction perpendicular to the sensing face and configured to attach the body to the attaching portion with the sensing face opposed to the magnetized face. The plurality of resilient pieces are provided on the body for resilient deformation in a direction perpendicular to the sensing face and configured to contact, in a state wherein the body is attached to the attaching portion by the single screen, with the attaching portion so as to be resiliently deformed all by the same amount by the attaching portion thereby to keep the sensing face in parallel to the magnetized face. The resilient pieces are formed such that, in a state wherein the resilient pieces are resiliently deformed all by the same amount, the sum of moments by the resilient pieces which act upon the location of the body at which the screw is fitted is zero.

With the lens barrel and the image pickup apparatus, even if the single screw is tightened or loosened, the sensing face keeps a position parallel to the magnetized face and can be moved in a direction perpendicular to the magnetized face. Consequently, the sensing face and the magnetized face keep a parallel state to each other while an appropriate gap is formed between the sensing face and the magnetized face.

Accordingly, the detection signal outputted from the magnetic resistance sensor apparatus has the best quality, and this is advantageous in accurate position detection of the lens moving frame and hence in acquisition of a clear image.

Further, the magnetic resistance sensor apparatus has a simple configuration in that it includes a single screw and a plurality of resilient pieces. Consequently, the adjustment of the gap between the sensing face and the magnetized face can be performed simply by an operation of the single screw. Additionally, the number of parts can be reduced and assembly of the parts can be simplified. Consequently, the production cost of the lens barrel and the image pickup apparatus can be advantageously reduced.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENTS

First Embodiment

Figure 1:
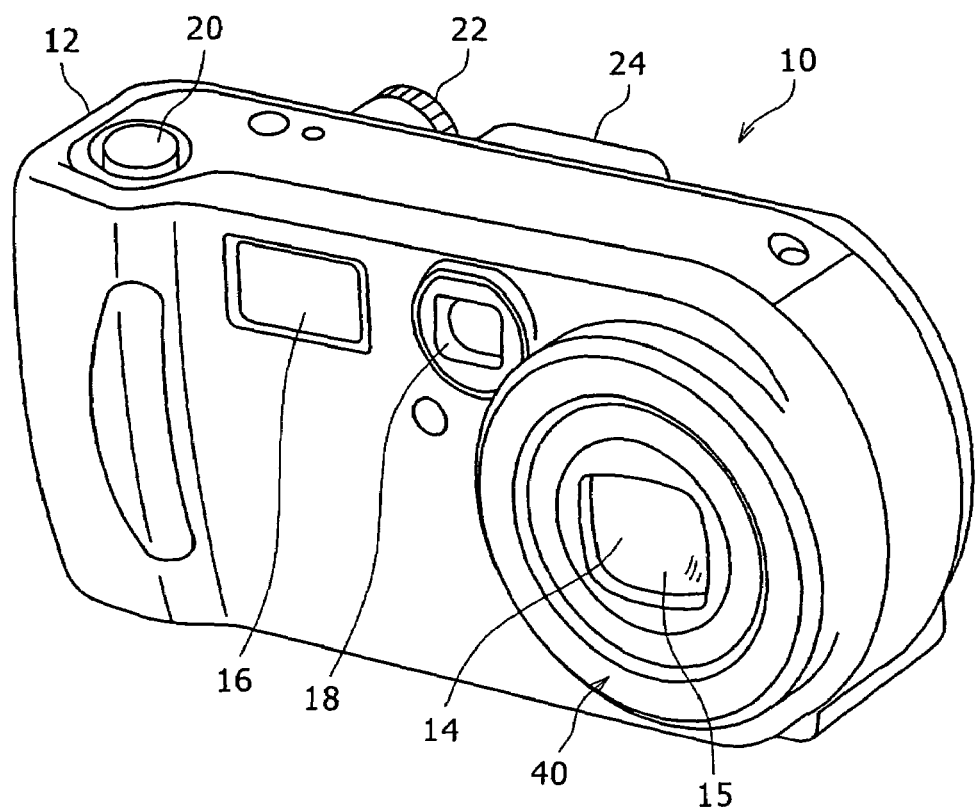
FIG. 1 is a perspective view of an image pickup apparatus according to a first embodiment of the present invention.
Figure 2:
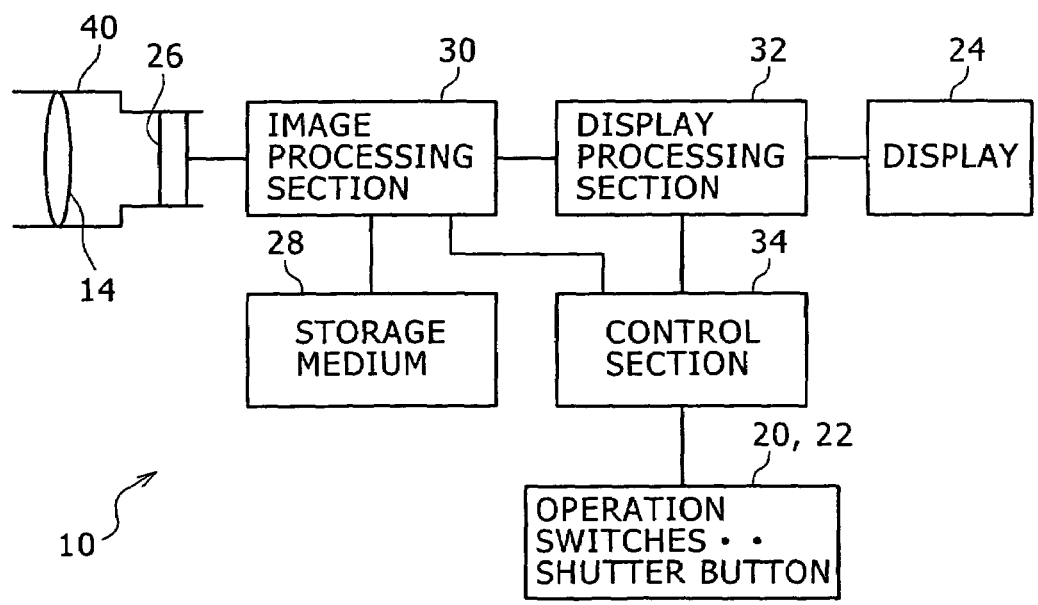
FIG. 2 is a block diagram showing a configuration of the image pickup apparatus.

First, a first preferred embodiment of the present invention is described. FIG. 1 is a perspective view of an image pickup apparatus according to the first embodiment, and FIG. 2 is a block diagram showing a configuration of the image pickup apparatus.

Referring first to FIG. 1, the image pickup apparatus 10 of the present embodiment is formed as a digital still camera and includes a casing 12 which forms a jacket.

A lens barrel 40 is provided at a portion of a front face of the casing 12 rather near to the right side in FIG. 1. The lens barrel 40 accommodates and holds an optical system 14 therein.

An image pickup device 26 (refer to FIG. 2) is provided at a rear portion of the lens barrel 40, and the optical system 14 provided in the lens barrel 40 introduces an image of an image pickup subject to the image pickup device 26. An objective lens 15 forms part of the optical system 14 and is provided at a front end of the lens barrel 40.

A flash section 16 for emitting flash light, an objective lens 18 of an optical finder, and so forth are provided at portions of the front face of the casing 12 rather near to the upper portion.

A shutter button 20 is provided at an upper end face of the casing 12. Meanwhile, an eyepiece window (not shown) of the optical finder mentioned hereinabove, a plurality of operation switches 22, a display unit 24 for displaying a picked up image and so forth are provided on a rear face of the casing 12. The operation switches 22 are provided for being operated to perform switching on/off of power supply, changeover of an image pickup mode or a reproduction mode and so forth.

The image pickup device 26 is formed from a CCD unit or a CMOS sensor unit for picking up an image of an image pickup subject formed by the optical system 14. Referring now to FIG. 2, the image pickup apparatus 10 includes an image processing section 30 for producing image data based on an image pickup signal outputted from the image pickup device 26 and recording the image data into a storage medium 28 such as a memory card, and a display processing section 32 for causing the image data to be displayed on the display unit 24. The image pickup apparatus 10 further includes a control section 34 having a CPU and so forth for controlling the image processing section 30 and the display processing section 32 in response to an operation of the shutter button 20 or any of the operation switches 22.

Now, the lens barrel 40 is described.

Figure 3:
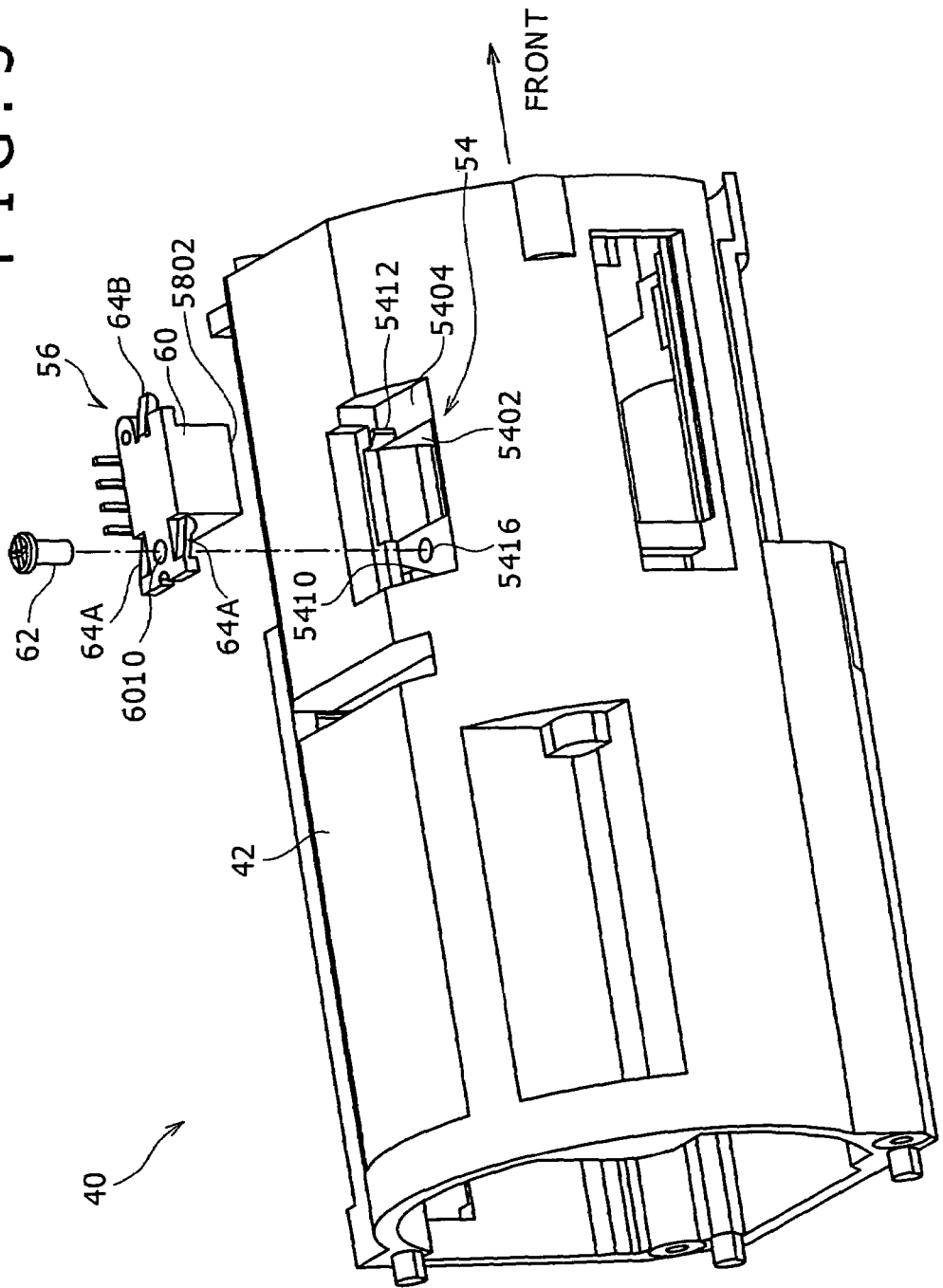
FIG. 3 is a perspective view of a lens barrel of the image pickup apparatus.
Figure 4:
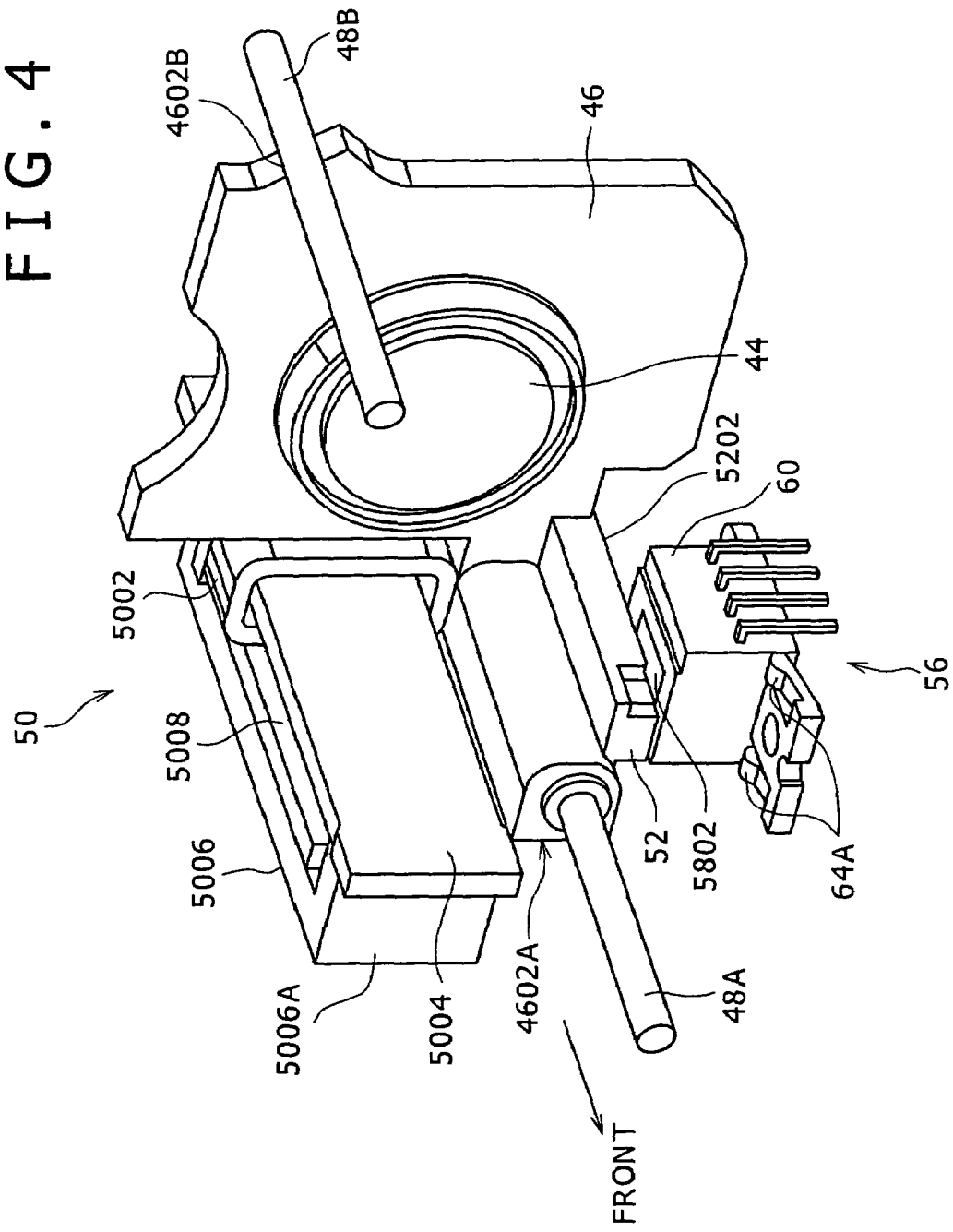
FIG. 4 is a perspective view showing an internal structure of the lens barrel.

FIG. 3 shows an appearance of the lens barrel 40, and FIG. 4 shows an internal structure of the lens barrel 40.

Referring to FIGS. 3 and 4, the lens barrel 40 includes a barrel member 42 in which the optical system 14 is disposed.

In the present embodiment, the optical system 14 includes the objective lens 15 (refer to FIG. 1), and an image pickup lens 44 disposed rearwardly of the objective lens 15 and held by the lens moving frame 46. The image pickup lens 44 may be, for example, a zoom lens moved by a zooming operation or a focusing lens moved by a focusing operation.

Referring to FIG. 4, a main guide rod 48A and a sub guide rod 48B are disposed in the barrel member 42. The main guide rod 48A and the sub guide rod 48B extend along the direction of an optical axis of the image pickup lens 44 and sandwich the lens moving frame 46 from the opposite sides in the direction of a diameter of the image pickup lens 44.

The lens moving frame 46 includes a bearing portion 4602A fitted on the main guide rod 48A, and another bearing portion 4602B engaged with the sub guide rod 48B. The lens moving frame 46 is thus supported for back and forth linear movement in the optical axis direction by the main guide rod 48A and the sub guide rod 48B.

A magnet 52 is attached to an outer periphery of the lens moving frame 46 as seen in FIG. 4.

The magnet 52 has an elongated shape with a rectangular cross section and is formed such that N poles and S poles are magnetized alternately along the direction of the back and forth linear movement of the lens moving frame 46.

A magnetized face 5202 is formed at a location of the magnet 52 which is opposed to an inner wall of the barrel member 42, and extends along the direction of the back and forth linear movement of the lens moving frame 46. The N poles and the S poles magnetized alternately form magnetic graduations on the magnetized face 5202.

In the present embodiment, the magnetized face 5202 is formed as a flat face.

A driving mechanism 50 for moving the lens moving frame 46 in the optical axis direction is provided in the barrel member 42 as seen in FIG. 4.

The driving mechanism 50 includes a coil 5002, an inner yoke 5004, an outer yoke 5006, and a driving magnet 5008.

The coil 5002 is attached by adhesion to an outer periphery of the lens moving frame 46 and is wound in a shape of a rectangular frame elongated around an axis parallel to the optical axis of the image pickup lens 44.

The inner yoke 5004 is formed in the form of a rectangular plate extending in the optical axis direction. The inner yoke 5004 is secured at the opposite ends thereof in the longitudinal direction to wall elements of the barrel member 42 such that it passes through the center hole of the coil 5002 and extends in parallel to the optical axis.

The outer yoke 5006 is formed as a rectangular plate extending in parallel to the inner yoke 5004 on the outer side of the coil 5002. The outer yoke 5006 has a pair of upright walls 5006A extending in parallel to the inner yoke 5004 from the opposite ends thereof in the longitudinal direction and is attached at the upright walls 5006A thereof to the opposite ends of the inner yoke 5004 in the longitudinal direction.

The driving magnet 5008 has a form of a rectangular plate extending in the optical axis direction and is attracted and secured to a face of the outer yoke 5006 between the two upright walls 5006A by magnetic force. The driving magnet 5008 is formed such that one of the faces thereof in the thicknesswise direction forms the N pole and the other face thereof in the thicknesswise direction forms the S pole.

It is to be noted that the upright walls 5006A of the outer yoke 5006 are attached to the inner yoke 5004 by attraction of the upright walls 5006A to the inner yoke 5004 by the magnetic force mentioned hereinabove.

Meanwhile, a winding portion of the coil 5002 is positioned in a gap formed between the inner yoke 5004 and the driving magnet 5008 such that it does not contact with any of the inner yoke 5004 and the driving magnet 5008.

Further, a flexible board (not shown) for supplying a driving signal therefrom is electrically connected to the coil 5002. Consequently, a driving signal is supplied to the coil 5002 from a drive circuit (not shown), which is controlled by the control section 34, through the flexible board.

It is to be noted that the configuration of the driving mechanism 50 is not limited to that described above, but various conventionally known structures can be adopted for the configuration.

Referring back to FIG. 3, an attaching portion 54 is formed at a portion of the barrel member 42 which is opposed to the magnetized face 5202, and a magnetic resistance sensor apparatus 56 is attached to the attaching portion 54.

The attaching portion 54 has an opening 5402, and a pair of attaching faces 5404 formed on the opposite sides of the opening 5402 along the direction in which the lens moving frame 46 is moved back and forth linearly. The attaching faces 5404 are provided so as to be positioned on a single plane parallel to the magnetized face 5202.

One of the attaching faces 5404 has a threaded hole 5416 formed thereon in a direction perpendicular to the attaching face 5404 and has a guide pin 5410 formed thereon such that it extends in a direction perpendicular to the attaching face 5404.

The other attaching face 5404 has a guide pin 5412 formed thereon such that it extends in a direction perpendicular to the attaching face 5404.

Referring back to FIG. 4, the magnetic resistance sensor apparatus 56 detects the magnetized face 5202 to produce a detection signal corresponding to the amount of movement of the lens moving frame 46 and supplies the detection signal to the control section 34.

Accordingly, if the control section 34 supplies the driving signal to the coil 5002 through the drive circuit described hereinabove, then a magnetic interaction is generated between a magnetic field generated by the coil 5002 and another magnetic field generated by a magnetic circuit formed from the inner yoke 5004, outer yoke 5006 and driving magnet 5008. Consequently, forward or rearward force is generated along the optical axis direction and acts on the coil 5002 so that the lens moving frame 46 is moved linearly in a forward or backward direction along the optical axis.

Further, the control section 34 controls the drive signal based on a detection signal from the magnetic resistance sensor apparatus 56 to servo control the position of the lens moving frame 46 in the optical axis direction.

Now, the magnetic resistance sensor apparatus 56 is described in detail.

Figure 5A:
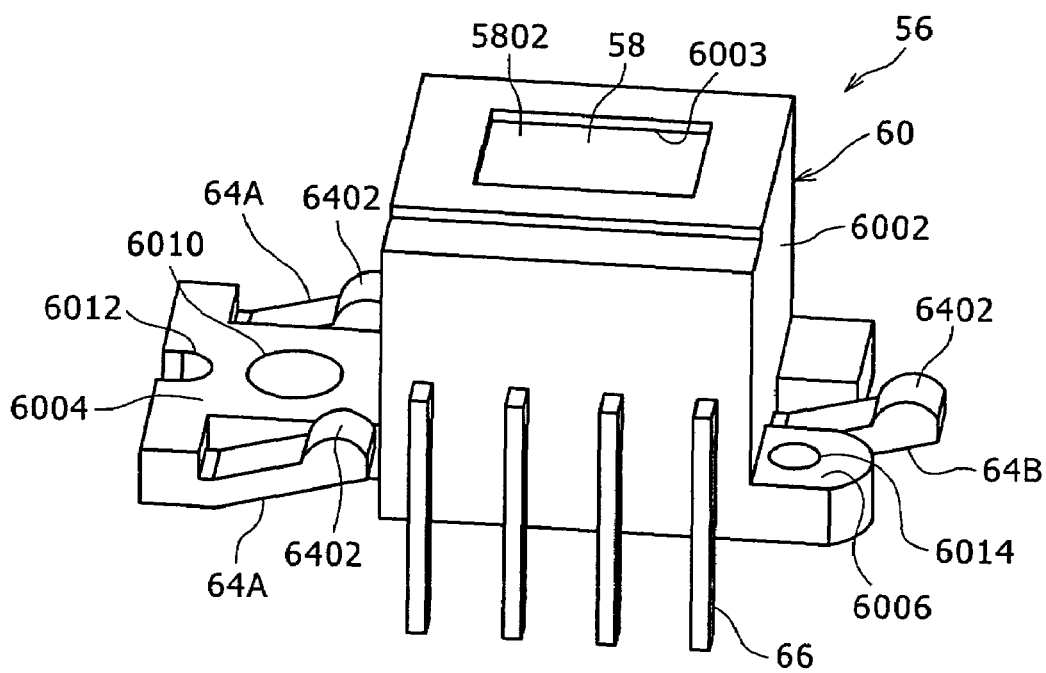
FIG. 5A is a perspective view of a magnetic resistance sensor device as viewed from above.
Figure 5B:
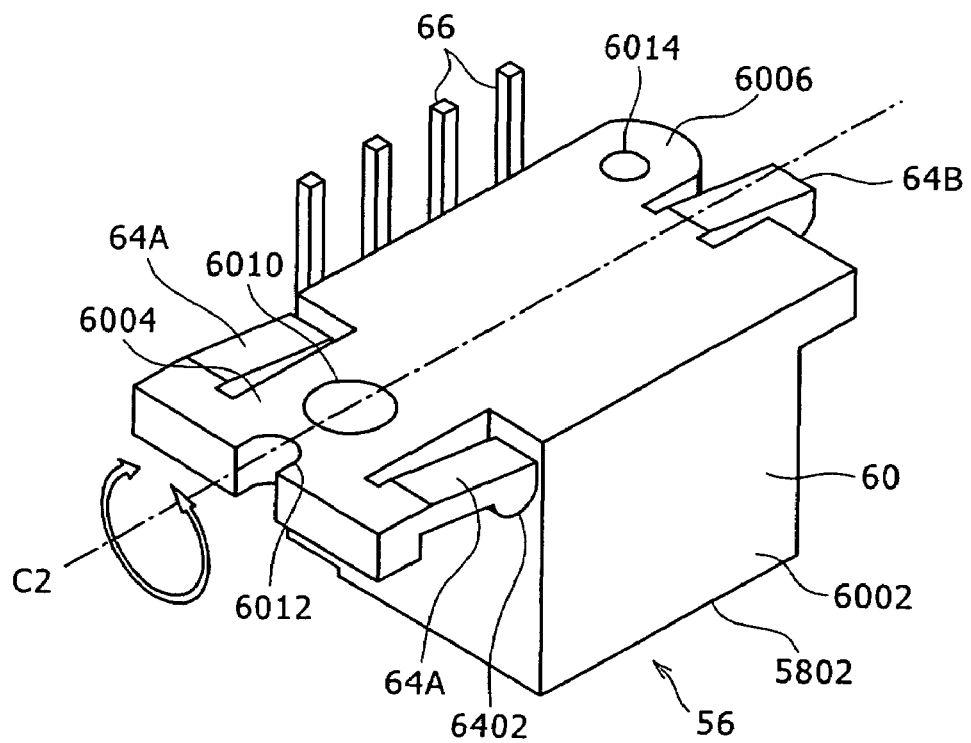
FIG. 5B is a perspective view of the magnetic resistance sensor device as viewed from below.

FIG. 5A is a perspective view of the magnetic resistance sensor apparatus 56 as viewed from above, while FIG. 5B is a perspective view of the magnetic resistance sensor apparatus 56 as viewed from below. Meanwhile, FIG. 6 is a perspective view of the magnetic resistance sensor apparatus 56 attached to the attaching portion 54 of the barrel member 42.

Figure 6:
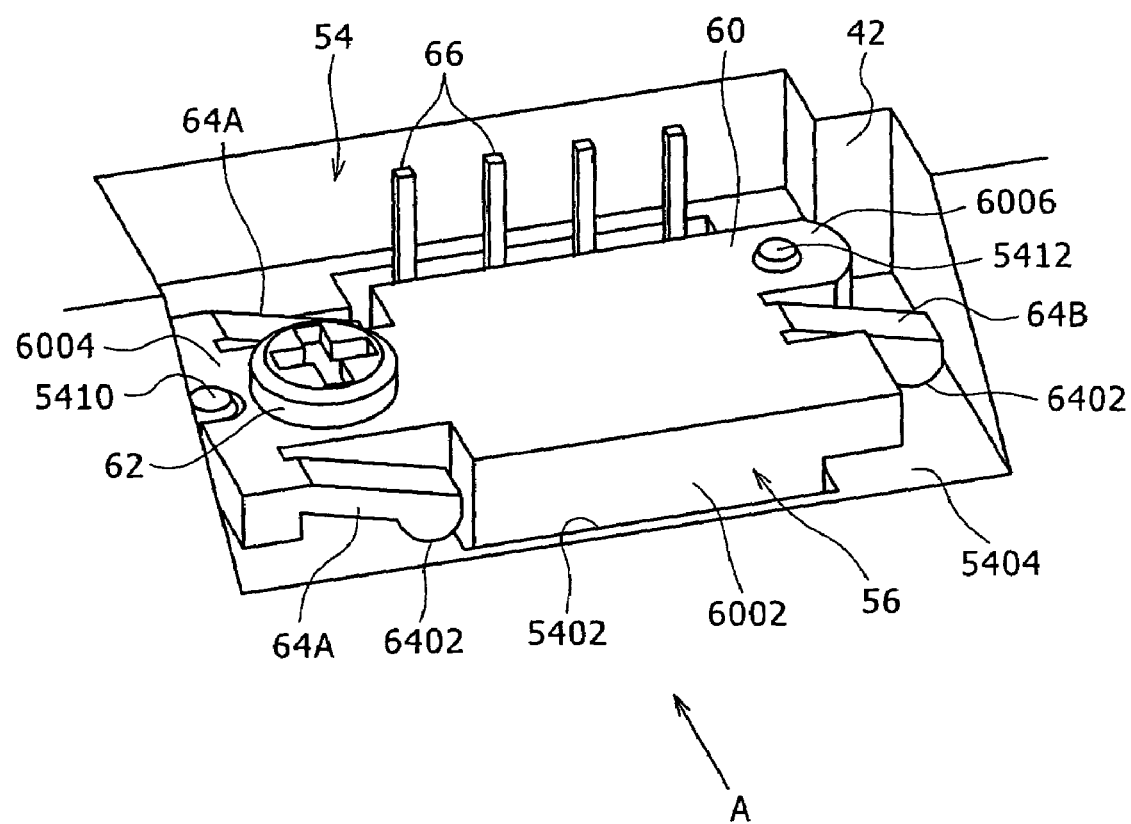
FIG. 6 is a perspective view showing the magnetic resistance sensor device attached to an attaching portion of a barrel member.

Referring to FIGS. 5A, 5B and 6, the magnetic resistance sensor apparatus 56 includes a magnetic resistance sensor 58, a body 60, a single screw 62, and a plurality of resilient pieces 64 (64A and 64B).

The magnetic resistance sensor 58 has a sensing face 5802 for detecting a magnetic pole, that is, either an N pole or an S pole. The sensing face 5802 is formed as a flat face. The magnetic resistance sensor 58 detects a magnetic graduation of the magnetized face 5202 by means of the sensing face 5802 to produce the detection signal mentioned hereinabove.

Further, the magnetic resistance sensor 58 is configured such that, where it is conditioned such that an appropriate gap is assured between the sensing face 5802 and the magnetized face 5202 and the sensing face 5802 and the magnetized face 5202 extend in parallel to each other, the detection signal has the best quality, and accurate position detection can be performed. The appropriate gap is adjusted within a range of ±10 μm with reference to a reference value which is set, for example, to 80 μm.

The body 60 has a sensor holding portion 6002 of a rectangular parallelepiped shape having a rectangular cross section and a height.

The magnetic resistance sensor 58 is attached to the sensor holding portion 6002 such that the sensing face 5802 thereof is exposed. In the present embodiment, the magnetic resistance sensor 58 is embedded in the body 60 such that the sensing face 5802 is exposed to one end face of the sensor holding portion 6002 in the heightwise direction through an opening 6003 formed in the one end face.

The sensor holding portion 6002 is formed with a size with which it can be fitted into the opening 5402 of the attaching portion 54. In other words, the opening 5402 is formed with a contour greater than the sensing face 5802.

A plurality of terminals 66 are provided on a side face of the sensor holding portion 6002 so as to supply power to and extract the detection signal from the magnetic resistance sensor 58 therethrough.

A first boss portion 6004 and a second boss portion 6006 are formed in a projecting manner on the opposite shorter sides of the other end face of the sensor holding portion 6002 in the heightwise direction.

A screw insertion hole 6010 and a guide groove 6012 are formed to extend through the first boss portion 6004 in a direction perpendicular to the sensing face 5802.

The screw insertion hole 6010 and the guide groove 6012 are positioned on a center axis C2 which passes the centers of the shorter sides of the sensor holding portion 6002. In other words, the sensor holding portion 6002 of the body 60 has a width in a direction perpendicular to the direction along which the lens moving frame 46 is moved back and forth linearly. The screw insertion hole 6010, that is, the location of the body 60 at which the screw 62 is fitted, is positioned on the center axis C2 of the sensor holding portion 6002 of the body 60 which passes the center of the width and extends along the direction along which the lens moving frame 46 is moved back and forth linearly.

The second boss portion 6006 has a guide hole 6014 formed to extend in a direction perpendicular to the sensing face 5802 therethrough.

It is to be noted that the screw insertion hole 6010 and the guide groove 6012 are provided at locations corresponding to the threaded hole 5416 and the guide pin 5410 of the attaching portion 54, respectively, and the guide hole 6014 is provided at a location corresponding to the guide pin 5412 of the attaching portion 54.

Accordingly, when the guide groove 6012 and the guide hole 6014 are fitted with the guide pins 5410 and 5412, respectively, in a state wherein the sensor holding portion 6002 is fitted in the opening 5401 from the one end face of the sensor holding portion 6002 in the heightwise direction to which the sensing face 5802 is exposed, the body 60 is guided for movement in a direction perpendicular to the sensing face 5802. In this state, the threaded hole 5416 and the screw insertion hole 6010 are positioned coaxially.

In the present embodiment, the sensing face 5802 has a rectangular shape, and the magnetic resistance sensor apparatus 56 is attached to the attaching portion 54 such that the longer sides of the sensing face 5802 extend in parallel to the direction in which the lens moving frame 46 is moved back and forth linearly.

As seen in FIGS. 3 and 6, the single screw 62 is screwed into the threaded hole 5416 of the attaching portion 54 through the screw insertion hole 6010 to attach the body 60 to the attaching portion 54. The screw 62 is fitted in the body 60 in a direction perpendicular to the sensing face 5802.

A resilient piece 64 is provided for resilient deformation in a direction perpendicular to the sensing face 5802. In particular, in the present embodiment, three such resilient pieces 64 including two resilient pieces 64A and one resilient piece 64B are provided as seen in FIGS. 5A, 5B and 6.

In the present embodiment, the body 60, that is, the sensor holding portion 6002, first boss portion 6004, second boss portion 6006 and resilient pieces 64A and 64B are formed integrally as a unitary member from a synthetic resin material.

The resilient pieces 64 are described in more detail. The two resilient pieces 64A are formed on the opposite sides of an end of the first boss portion 6004 in such a manner as to extend toward the sensor holding portion 6002. The two resilient pieces 64A are provided in a spaced relationship from the center axis C2. In other words, the two resilient pieces 64A are formed in the same structure at locations symmetrical to each other with respect to the center axis C2. In other words, the sum of the moments by the resilient pieces 64A is zero in a direction perpendicular to the center axis C2.

The single resilient piece 64B is provided at the center of the shorter side of the sensor holding portion 6002, on which the second boss portion 6006 is provided, in such a manner as to extend in a direction away from the shorter side. More particularly, the resilient piece 64B is provided in such a manner as to extend along the center axis C2, and the moment by the resilient piece 64B in a direction perpendicular to the center axis C2 is zero.

A contacting portion 6402 is formed in a swollen manner at an end of each of the resilient pieces 64A and 64B for contacting with the attaching faces 5404.

Then, in a state wherein the sensor holding portion 6002 is inserted in the opening 5402 and the contacting portions 6402 at the ends of the resilient pieces 64A and 64B contact with the attaching faces 5404 such that the resilient pieces 64A and 64B are resiliently deformed by the equal amount with respect to the attaching faces 5404, and the sensing face 5802 extends in parallel to the magnetized face 5202.

Further, the resilient pieces 64A and 64B are configured such that, in a state wherein the resilient pieces 64A and 64B are resiliently deformed by the equal amount, the sum of the moments by the resilient pieces 64A and 64B which act upon the location of the body 60 in which the screw 62 is inserted, that is, the screw insertion hole 6010, in the direction along the center axis C2 is zero.

Accordingly, if the sensor holding portion 6002 is inserted into the opening 5402 and the contacting portions 6402 at the ends of the resilient pieces 64A and 64B are contacted with the attaching faces 5404 and then the screw 62 is screwed into the threaded hole 5416 and tightened or loosened in the threaded hole 5416, then the resilient pieces 64A and 64B are resiliently deformed by the equal amount with respect to the attaching faces 5404 of the attaching portion 54. Consequently, the sensing face 5802 keeps a state in which it extends in parallel to the magnetized face 5202, and is moved in a direction perpendicular to the magnetized face 5202.

In the present embodiment, since the guide pin 5410 is fitted into the guide groove 6012 and the guide pin 5412 is fitted into the guide hole 6014, parallel movement of the sensing face 5802 with respect to the magnetized face 5202, that is, the movement of the body 60, is performed stably.

It is to be noted that, if the screw 62 is tightened or loosened to parallelly move the sensing face 5802 with respect to the magnetized face 5202 to adjust the distance between the sensing face 5802 and the magnetized face 5202, then the body 60 is secured to the attaching portion 54 arbitrarily using a bonding agent.

The parallel movement of the sensing face 5802 with respect to the magnetized face 5202 is described in more detail with reference to FIG. 7.

Figure 7:
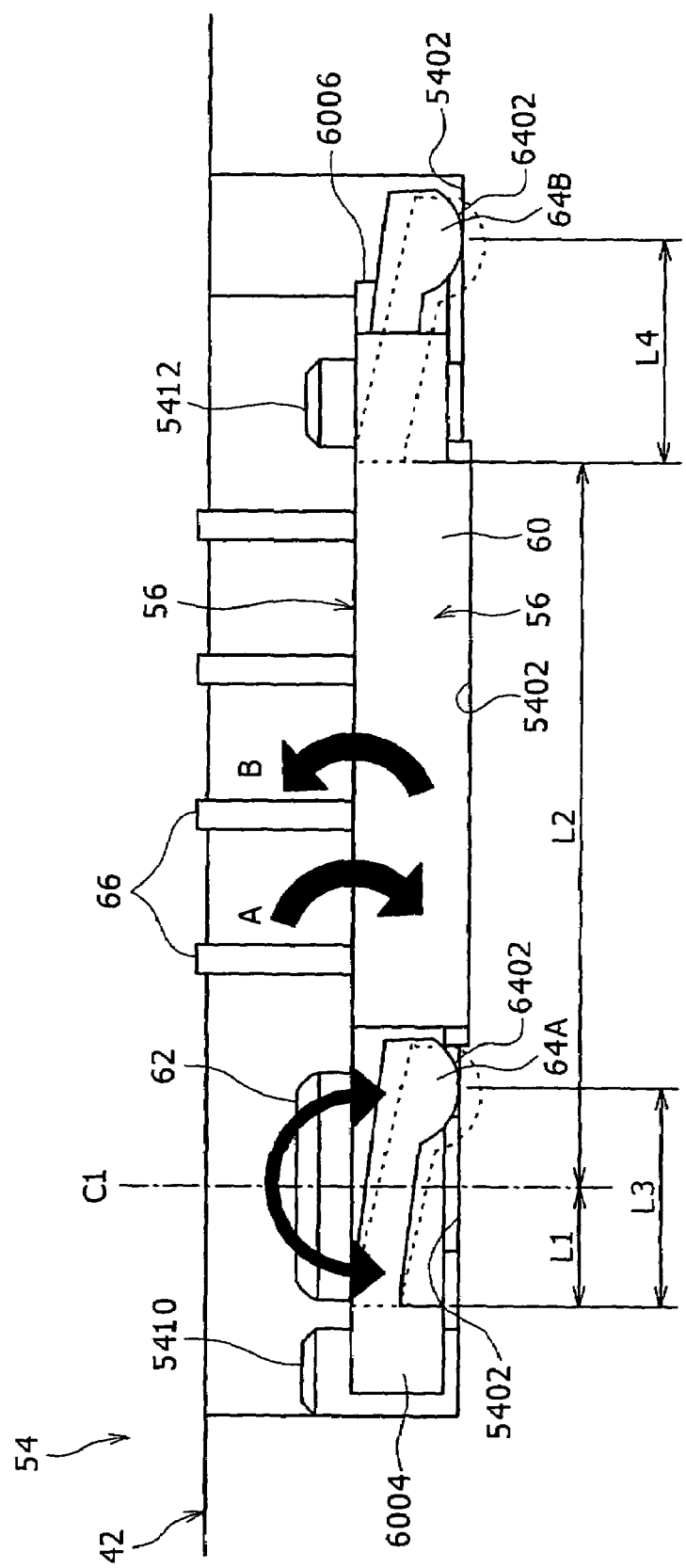
FIG. 7 is a view as viewed in the direction indicated by an arrow mark A in FIG. 6.

FIG. 7 is a view as viewed in the direction indicated by an arrow mark A in FIG. 6.

The distance between the center C1 of the screw 62 and base portions of the resilient pieces 64A, that is, a location at which the resilient pieces 64A are connected to the sensor holding portion 6002, is represented by L1. The distance between the center C1 of the screw 62 and a base portion of the resilient piece 64B, that is, a location at which the resilient piece 64B is connected to the sensor holding portion 6002, is represented by L2. The distance between the base portions of the resilient pieces 64A and the location at which the contacting portion 6402 contact with the attaching face 5404, is represented by L3. Further, the distance between the base portion of the resilient piece 64B and the location at which the contacting portion 6402 of the resilient piece 64B contacts with the opening 5402, is represented by L4.

Further, the geometrical moment of inertia of the resilient pieces 64A is represented by Ia, and the geometrical moment of inertia of the resilient piece 64B is represented by Ib. Further, the modulus of longitudinal elasticity of the material from which the resilient pieces 64A and 64B are formed is represented by E, and the deformation amount of the resilient pieces 64A is represented by Ya while the deformation amount of the resilient piece 64B is represented by Yb. Further, the moment by the two resilient pieces 64A which acts upon the center C1 of the screw insertion hole 6010, that is, the location in which the single screw 62 is fitted, is represented by A, and the moment by the single resilient piece 64B which acts upon the center C1 of the screw 62, that is, the location at which the single screw 62 is fitted, is represented by B.

Thus, the moments A and B are represented by the following expressions (1) and (2), respectively:

$$A = 2 \times (3 \times E \times Ia \times Ya / L3^3) \times L1 \quad (1)$$

$$B = (3 \times E \times Ib \times Yb / L4^3) \times L2 \quad (2)$$

Here, in order for the moments A and B to balance with each other, A=B should be satisfied. Therefore, $$2 \times (3 \times E \times Ia \times Ya / L3^3) \times L1 = (3 \times E \times Ib \times Yb / L4^3) \times L2 \quad (3)$$

By arranging the expression (3), $$2 \times (Ia \times Ya / L3^3) \times L1 = (Ib \times Yb / L4^3) \times L2 \quad (4)$$

Accordingly, if the expression (4) is satisfied, then the balance between the moments A and B is established. In other words, the sum of the moments A and B becomes equal to zero in the direction along the center axis C2.

It is to be noted that, if the deformation amounts of the resilient pieces 64A and the resilient piece 64B is equal to each other (Ya=Yb), and the cross sectional shapes of the resilient pieces 64A and the resilient piece 64B are the same (Ia=Ib), then the expression (4) is simplified to $$2 \times L3^3 \times L1 = L4^3 \times L2 \quad (5)$$

In particular, since the moments A and B by the resilient pieces 64A and 64B acting upon the location of the body 60 at which the screw 62 is fitted, balance with each other in any direction, (that is, since the sum of the moments A and B becomes zero), if the single screw 62 is tightened or loosened, then the plural resilient pieces 64 are resiliently deformed all by the same amount with respect to the attaching faces 5404 of the attaching portion 54. Accordingly, the sensing face 5802 keeps a parallel position with respect to the magnetized face 5202 and is also moved in a direction perpendicular to the magnetized face 5202.

According to the present embodiment, irrespective of whether the single screw 62 is tightened or loosened, the sensing face 5802 keeps a parallel position with respect to the magnetized face 5202 and can move in a direction perpendicular to the magnetized face 5202 as described above. Therefore, while the sensing face 5802 and the magnetized face 5202 keep a parallel condition to each other, an appropriate gap can be formed between the sensing face 5802 and the magnetized face 5202. Therefore, the detection signal outputted from the magnetic resistance sensor apparatus 56 has the best quality. This is advantageous in accurate position detection of the lens moving frame 46 and hence in acquisition of a clear image.

Further, the magnetic resistance sensor apparatus 56 has a simple configuration which includes the single screw 62 and the plural resilient pieces 64A and 64B. Therefore, the gap adjustment can be performed by a simple operation of the single screw 62. Additionally, the number of parts can be reduced and the assembly can be simplified when compared with those of apparatus in the past. This is advantageous in the reduction of the production cost.

Further, in the present embodiment, the sensor holding portion 6002, first boss portion 6004, second boss portion 6006 and resilient pieces 64A and 64B of the body 60 of the magnetic resistance sensor apparatus 56 are integrally formed as a unitary member from a synthetic resin material. This is further advantageous in the reduction of the production cost when compared with of apparatuses of the past.

Second Embodiment

Now, a second preferred embodiment of the present invention is described.

Figure 8:
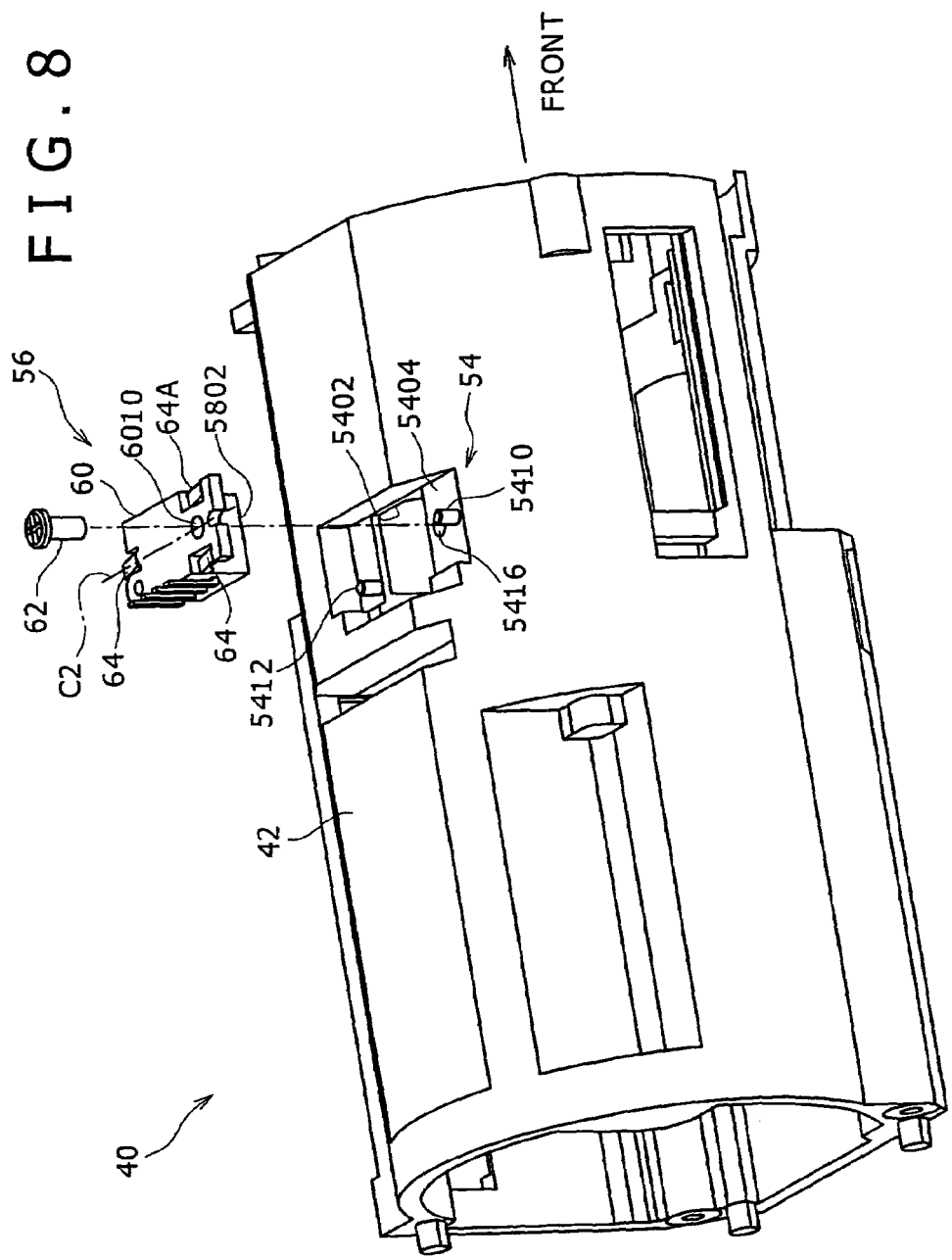
FIG. 8 is a perspective view of a lens barrel according to a second embodiment of the present invention.

FIG. 8 is a perspective view of a lens barrel 40 according to the second embodiment of the present invention.

The second embodiment is a modification to but is different from the first embodiment described hereinabove in that the magnetic resistance sensor apparatus 56 is attached to the attaching portion 54 in a state wherein the sensing face 5802 is rotated by 90 degrees around an axial line which extends perpendicularly to the magnetized face 5202 and passes the magnetized face 5202.

In particular, in the second embodiment, the sensor holding portion 6002 (the body 60) has a width along the direction in which the lens moving frame 46 is moved back and forth linearly. Further, the screw insertion hole 6010, (that is, the location of the body 60 at which the single screw 62 is fitted), is positioned on the center axis C2 of the sensor holding portion 6002 (the body 60) which passes the center of the width and extends along a direction perpendicular to the direction in which the lens moving frame 46 is moved back and forth linearly. Further, the screw insertion hole 6010 and the guide groove 6012 are positioned on the center axis C2 which passes the centers of the shorter sides of the sensor holding portion 6002.

Further, although the sensing face 5802 exhibits a rectangular shape, similar to that of the first embodiment, the magnetic resistance sensor apparatus 56 is attached to the attaching portion 54 such that the shorter sides of the sensing face 5802 extend in parallel to the direction in which the lens moving frame 46 is moved back and forth linearly, different from that in the first embodiment.

Similar advantages to those achieved by the first embodiment can be achieved also by the second embodiment having the configuration described above.

Third Embodiment

Now, a third preferred embodiment of the present invention is described.

Figure 9:
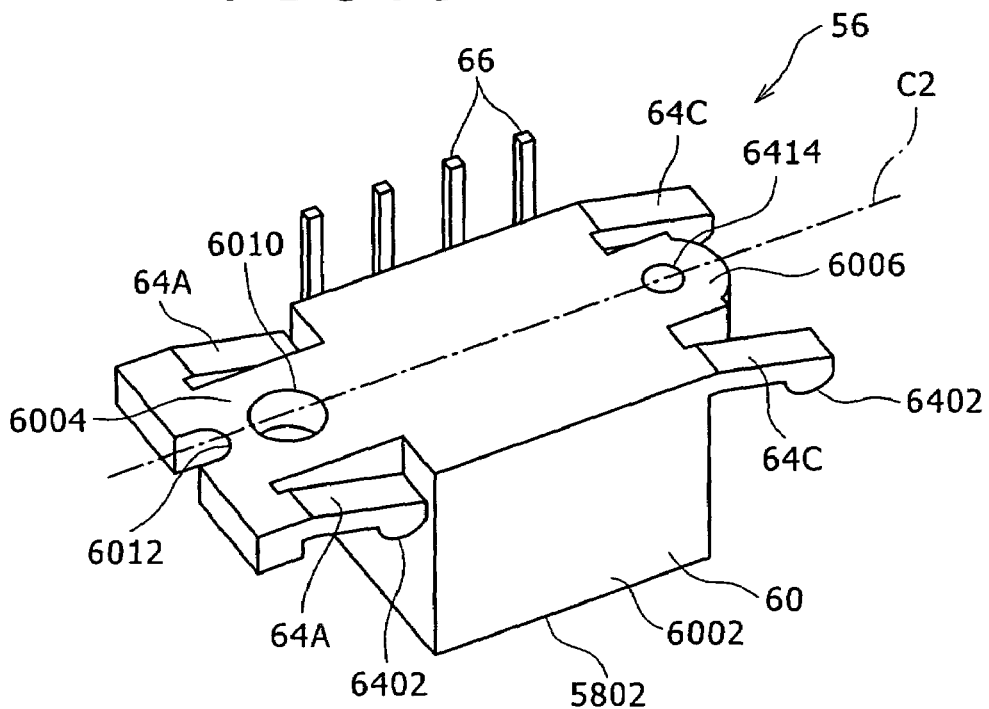
FIG. 9 is a perspective view of a magnetic resistance sensor apparatus of a lens barrel according to a third embodiment of the present invention.

FIG. 9 is a perspective view of a magnetic resistance sensor apparatus 56 according to the third embodiment of the present invention.

The third embodiment is a modification to but is different from the first embodiment described hereinabove in the location of guide holes 6414 and the number and the location of the resilient pieces 64.

Referring to FIG. 9, the sensor holding portion 6002 (the body 60) has a width in a direction perpendicular to the direction in which the lens moving frame 46 is moved back and forth linearly, similar to that of the first embodiment.

The screw insertion hole 6010, (that is, the location of the body 60 at which the single screw 62 is fitted), the guide groove 6012 and the guide hole 6414 are positioned on the center axis C2 of the sensor holding portion 6002 (the body 60) which passes the center of the width and extends in the direction in which the lens moving frame 46 is moved back and forth linearly.

The two resilient pieces 64A on the opposite sides of the end of the first boss portion 6004 are provided in the same structure at symmetrical locations with respect to the center axis C2.

Further, two resilient pieces 64C are provided on the second boss portion 6006 side and are provided in the same structure at symmetrical locations with respect to the center axis C2.

Further, the resilient pieces 64A and 64C are configured such that the moments by the resilient pieces 64A and 64C, which act upon the location of the body 60 at which the screw 62 is fitted balance with each other (or in other words, the sum of the moments by the resilient pieces 64A and 64C is zero). Thus, if the single screw 62 is tightened or loosened, then the resilient pieces 64 are resiliently deformed all by the equal amount with respect to the attaching faces 5404 (the attaching portion 54). Accordingly, the sensing face 5802 keeps a parallel state with respect to the magnetized face 5202 and is moved in a direction perpendicular to the magnetized face 5202.

Similar advantages to those of the first embodiment can be achieved also by the third embodiment having the configuration described above.

Fourth Embodiment

Now, a fourth preferred embodiment of the present invention is described.

Figure 10:
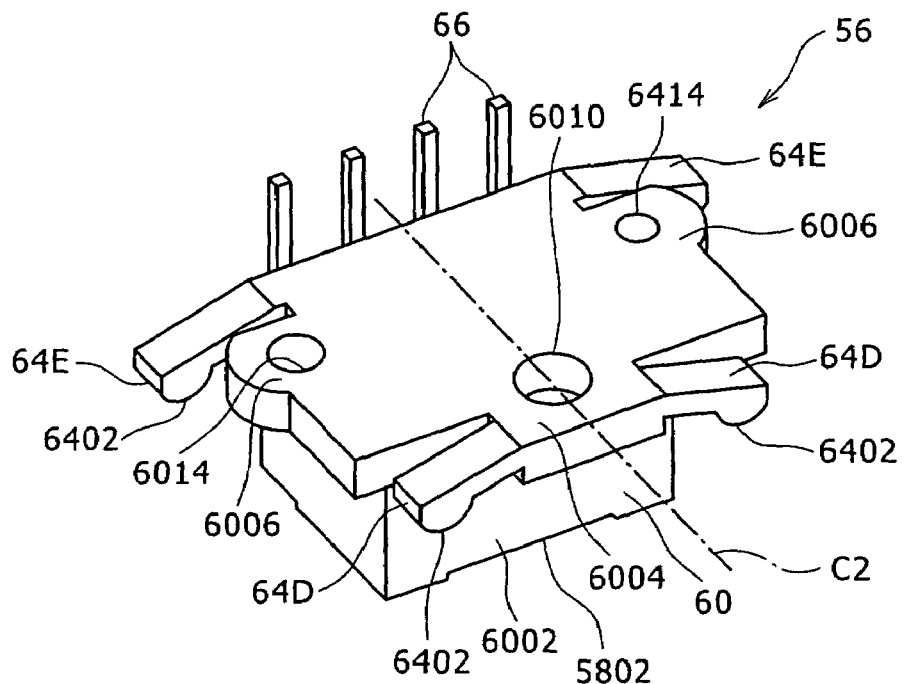
FIG. 10 is a perspective view of a magnetic resistance sensor apparatus of a lens barrel according to a fourth embodiment of the present invention.

FIG. 10 is a perspective view of a magnetic resistance sensor apparatus 56 according to the fourth embodiment of the present invention.

The fourth embodiment is a modification to but is different from, the second embodiment described hereinabove in the location of the guide holes 6414 and the number and the location of the resilient pieces 64.

The sensor holding portion 6002 (the body 60) has a width along a direction perpendicular to the direction in which the lens moving frame 46 is moved back and forth linearly, similar to that of the second embodiment.

The screw insertion hole 6010, (that is, the location of the body 60 at which the single screw 62 is fitted), is positioned on the center axis C2 of the sensor holding portion 6002 (the body 60) which passes the center of the width and extends in the direction perpendicular to the direction in which the lens moving frame 46 is moved back and forth linearly.

Further, two second boss portions 6006 are provided at locations opposite to the first boss portion 6004, and a guide hole 6414 is provided in each of the second boss portions 6006. The guide holes 6414 are provided at locations symmetrical with respect to the center axis C2.

Four resilient pieces 64 are provided, and two resilient pieces 64D from among the four resilient pieces 64 are formed on the opposite sides of the first boss portion 6004 in such a manner as to project in a direction away from the center axis C2. The two resilient pieces 64D are formed in the same structure at locations symmetrical with respect to the center axis C2.

The remaining two resilient pieces 64E are provided in a juxtaposed relationship with the individual second boss portions 6006 and are formed in such a manner as to project in a direction away from the center axis C2, similar to the resilient pieces 64D. The two resilient pieces 64E are formed in the same structure at locations symmetrical with respect to the center axis C2.

Further, the resilient pieces 64D and 64E are formed such that the moments thereby, which act upon the location of the body 60 at which the screw 62 is fitted, balance with each other (that is, the sum of the moments by the resilient pieces 64D and 64E is zero). Thus, if the single screw 62 is tightened or loosened, then the plural resilient pieces 64 are deformed all by the equal amount with respect to the attaching faces 5404 (the attaching portion 54). Accordingly, the sensing face 5802 keeps a state parallel to the magnetized face 5202 and is moved in the direction perpendicular to the magnetized face 5202.

Similar advantages to those of the first embodiment can be achieved also by the fourth embodiment having the configuration described above.

It is to be noted that, although the location of the body 60 at which the single screw 62 is fitted, the location and the structure of the resilient piece 64, and so forth, may be modified variously from those described hereinabove, the configurations of the embodiments are advantageous in the achievement of simplification in structure.

Further, although the number of resilient pieces 64 may be any number, employment of three resilient pieces 64 as in the first and second embodiments is advantageous in the attachment of the magnetic resistance sensor apparatus 56 in a stable state and also in achievement of the reduction in space when compared with an alternative case wherein four or more resilient pieces 64 are provided.

Further, while various attaching structures may be applied as the attaching structure of the magnetic resistance sensor 58 to the body 60, the attaching structure used in any of the embodiments described above is advantageous in regard to the handling of the magnetic resistance sensor apparatus 56 and achievement of reduction in space.

Further, the sensing face 5802 can be disposed on the magnetic resistance sensor apparatus 56 in two forms rotated by 90 degrees around the axial line which passes the center of the magnetized face 5202 and extends perpendicularly to the magnetized face 5202 as in the first to fourth embodiments. This is advantageous in the assurance of the degree of freedom in the design for the attachment of the magnetic resistance sensor apparatus 56.

Furthermore, while in the embodiments described above, a digital still camera is used as the image pickup apparatus, the present invention can be applied to various other image pickup apparatus including a video camera.

While preferred embodiments of the present invention have been described using specific terms, such description is for illustrative purposes only, and it is to be understood that changes and variations may be made without departing from the spirit or scope of the following claims.

What is claimed is:

1. A lens barrel, comprising:
a lens moving frame configured to hold an image pickup lens;
a barrel member configured to support said lens moving frame for back and forth linear movement along the direction of an optical axis of said image pickup lens;
said lens moving frame having a magnetized face magnetized alternately with N poles and S poles along the direction of the back and forth linear movement; and
a magnetic resistance sensor apparatus provided at an attaching portion of said barrel member and configured to detect said magnetized face to produce a detection signal corresponding to an amount of movement of said lens moving frame;
said magnetic resistance sensor apparatus including
a magnetic resistance sensor having a sensing face,
a body having said magnetic resistance sensor attached to the body with said sensing face exposed,
a single screw fitted in said body in a direction perpendicular to said sensing face and configured to attach said body to said attaching portion with said sensing face opposed to said magnetized face, and
a plurality of resilient pieces provided on said body for resilient deformation in a direction perpendicular to said sensing face and configured to contact, in a state wherein said body is attached to said attaching portion by said single screw, with said attaching portion so as to be resiliently deformed all by the same amount by said attaching portion to keep said sensing face in parallel to said magnetized face,
said resilient pieces being formed such that, in a state wherein said resilient pieces are resiliently deformed all by the same amount, the sum of moments by said resilient pieces which act upon the location of said body at which said screw is fitted is zero.

2. The lens barrel according to claim 1, wherein said attaching portion has a guide pin and configured to guide said body for movement in a direction perpendicular to said sensing face.

3. The lens barrel according to claim 1, wherein said body has a width in a direction perpendicular to the direction of the back and forth linear movement, and the location of said body at which said single screw is fitted is positioned on a center line of said body which passes the center of the width and extends in the direction of the back and forth linear movement.

4. The lens barrel according to claim 1,
wherein said body has a width along the direction of the back and forth linear movement, and the location of said body at which said single screw is fitted is positioned on a center line of said body which passes the center of the width and extends in a direction perpendicular to the direction of the back and forth linear movement.

5. The lens barrel according to claim 1,
wherein said attaching portion has attaching faces extending on a single plane parallel to said sensing face and an opening formed with a profile greater than said sensing face, and said sensing face is opposed to said magnetized face through said opening while said resilient pieces contact at the ends with said attaching faces through said opening.

6. The lens barrel according to claim 1,
wherein said attaching portion has attaching faces extending on a single plane parallel to said sensing face and an opening formed with a profile greater than said sensing face and said attaching faces are provided so as to be positioned on the opposite sides of said opening, and said sensing face is opposed to said magnetized face through said opening while one or more of said resilient pieces contact at the ends with one of said attaching faces while the remaining resilient piece or pieces contact at the ends with the other one of said attaching faces which are provided on the opposite sides of said opening through said opening.

7. The lens barrel according to claim 1,
wherein said attaching portion has attaching faces extending on a single plane parallel to said sensing face and an opening formed with a profile greater than said sensing face, and said sensing face is opposed to said magnetized face through said opening while said resilient pieces contact at the ends with said attaching faces through said opening, one of said attaching faces having a threaded hole such that said single screw is screwed in said threaded hole.

8. The lens barrel according to claim 1,
wherein said attaching portion has attaching faces extending on a single plane parallel to said sensing face and an opening formed with a profile greater than said sensing face, and said sensing face is opposed to said magnetized face through said opening while said resilient pieces contact at the ends with said attaching faces through said opening, one of said attaching faces having a threaded hole and a guide pin such that said single screw is screwed in said threaded hole, said guide pin being configured to guide said body for movement in a direction perpendicular to said sensing face.

9. The lens barrel according to claim 1,
wherein said sensing face has a rectangular shape, and said magnetic resistance sensor apparatus is attached to said attaching portion such that longer sides of said sensing face extend in parallel to the direction of the back and forth linear movement.

10. The lens barrel according to claim 1,
wherein said sensing face has a rectangular shape, and said magnetic resistance sensor apparatus is attached to said attaching portion such that shorter sides of said sensing face extend in parallel to the direction of the back and forth linear movement.

11. The lens barrel according to claim 1,
wherein said body and said resilient pieces are molded integrally from a synthetic resin material.

12. An image pickup apparatus, comprising:
a lens barrel including an image pickup lens configured to introduce an image pickup subject image to an image pickup device, a lens moving frame configured to hold said image pickup lens, and a barrel member configured to support said lens moving frame for back and forth linear movement in the direction of an optical axis of said image pickup lens;
said lens moving frame having a magnetized face magnetized alternately with N poles and S poles along the direction of the back and forth linear movement; and
a magnetic resistance sensor apparatus provided at an attaching portion of said barrel member and configured to detect said magnetized face to produce a detection signal corresponding to an amount of movement of said lens moving frame;
said magnetic resistance sensor apparatus including
a magnetic resistance sensor having a sensing face, a body having said magnetic resistance sensor attached with said sensing face exposed, a single screw fitted in said body in a direction perpendicular to said sensing face and configured to attach said body to said attaching portion with said sensing face opposed to said magnetized face, and a plurality of resilient pieces provided on said body for resilient deformation in a direction perpendicular to said sensing face and configured to contact, in a state wherein said body is attached to said attaching portion by said single screw, with said attaching portion so as to be resiliently deformed all by the same amount by said attaching portion thereby to keep said sensing face in parallel to said magnetized face, said resilient pieces being formed such that, in a state wherein said resilient pieces are resiliently deformed all by the same amount, the sum of moments by said resilient pieces which act upon the location of said body at which said screw is fitted is zero.

* * * * *